Sept. 13, 1966  H. P. RAABE  3,273,155
FRESNEL ZONE LENS ANTENNA
Filed Sept. 13, 1963  4 Sheets-Sheet 1
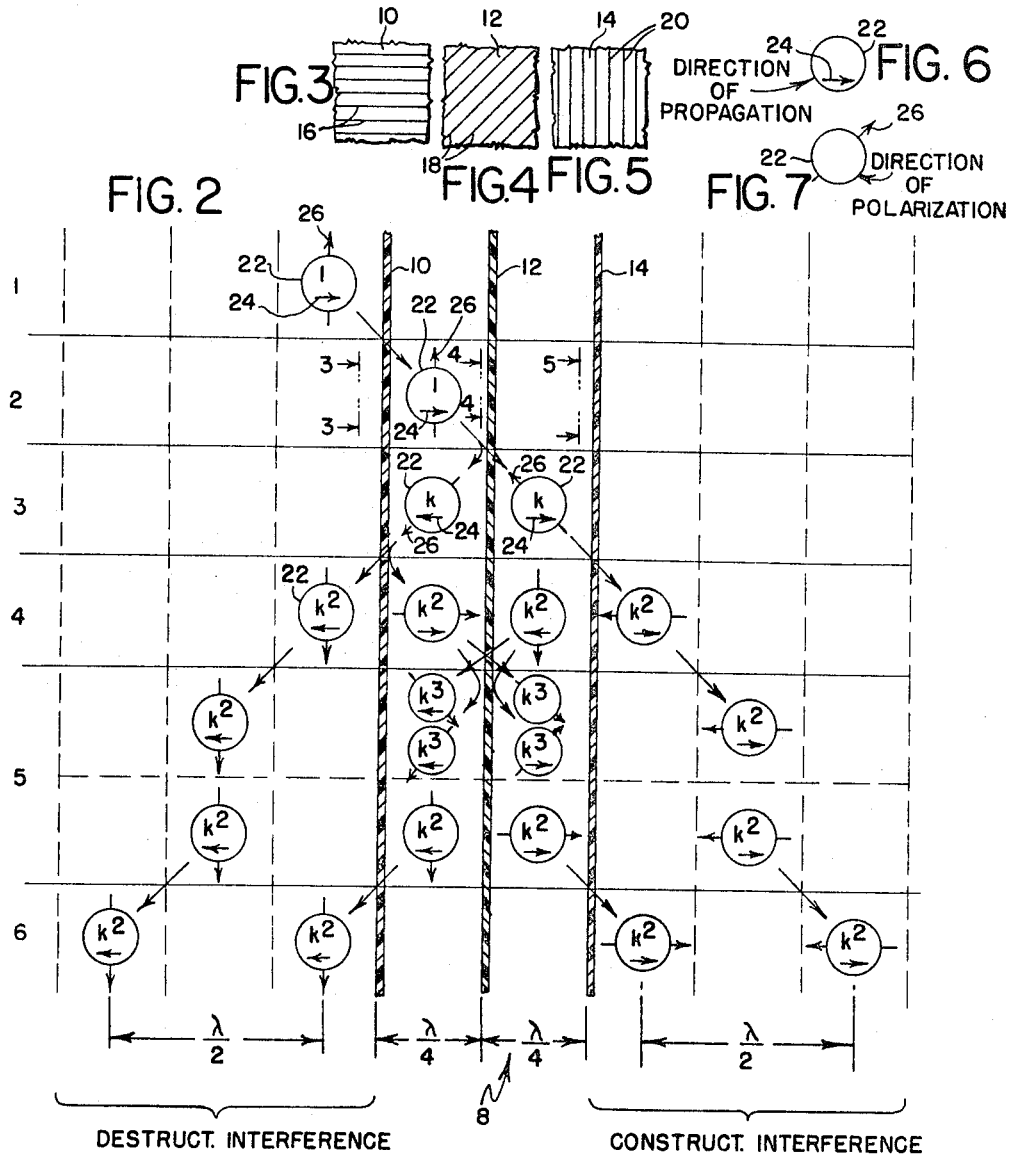
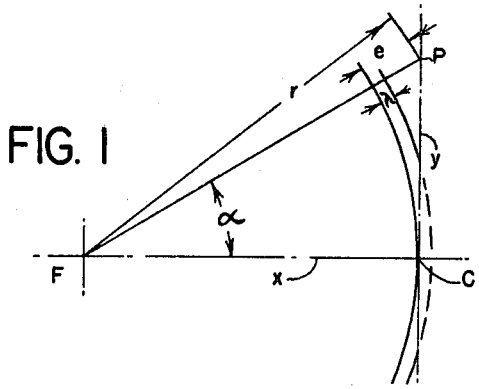
INVENTOR.
HERBERT P. RAABE
BY Stuart R. Peterson
ATTORNEY Sept. 13, 1966 H. P. RAABE 3,273,155
FRESNEL ZONE LENS ANTENNA
Filed Sept. 13, 1963 4 Sheets-Sheet 2

INVENTOR.
HERBERT P. RAABE
BY Stuart R. Peterson
ATTORNEY

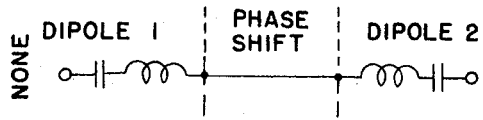
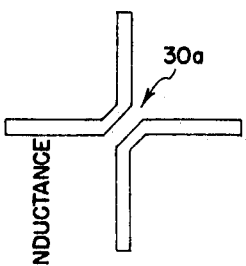
FIG. 14a  FIG. 14b
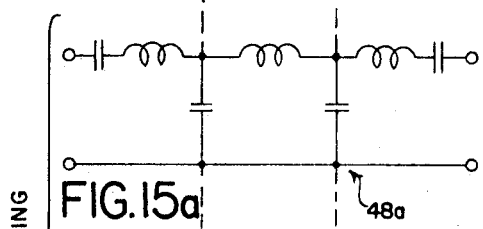
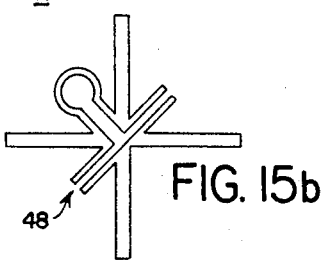
FIG. 15a  FIG. 15b
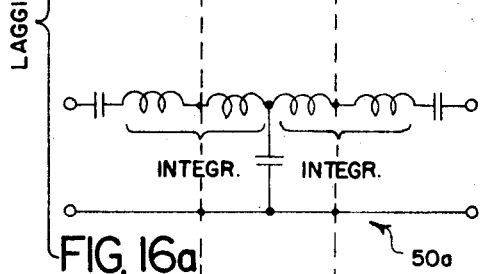
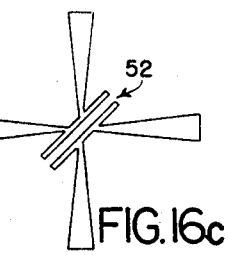
FIG. 16a  FIG. 16b  FIG. 16c
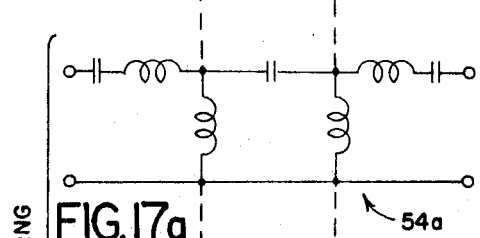
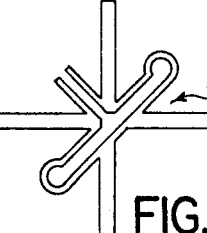
FIG. 17a  FIG. 17b
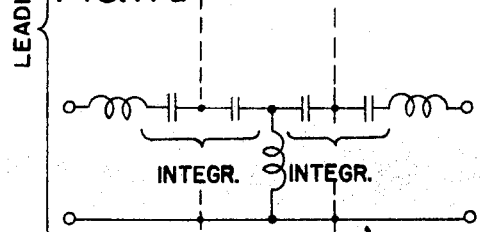
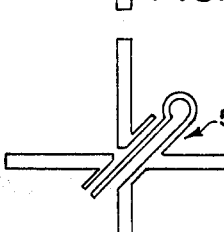
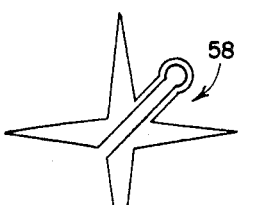
FIG. 18a  FIG. 18b  FIG. 18c Sept. 13, 1966    H. P. RAABE    3,273,155
FRESNEL ZONE LENS ANTENNA
Filed Sept. 13, 1963    4 Sheets-Sheet 4

INVENTOR.
HERBERT P. RAABE
BY
Stuart R. Peterson
ATTORNEY 3,273,155
FRESNEL ZONE LENS ANTENNA
Herbert P. Raabe, St. Paul, Minn., assignor, by mesne assignments, to Litton Systems, Inc., Beverly Hills, Calif., a corporation of Maryland
Filed Sept. 13, 1963, Ser. No. 308,861
13 Claims. (Cl. 343—753)

This invention relates generally to antennas, and pertains more particularly to a Fresnel zone lens antenna.

In order to form a concentrated beam of electromagnetic radiation, it is necessary to generate a plane wave front over a sufficiently large aperture. Because the energy is ordinarily supplied through a transmission line which is terminated by a radiating feed, the antenna must transform the spherical wave provided by the feed into a plane wave. This is accomplished in most antennas through the agency of a parabolic reflector, although some antennas use a transmissive element or lens. It will be appreciated, however, that a parabolic reflector must be shaped with a high degree of precision. The doubly curved surface, for instance, is exceedingly difficult to manufacture. Consequently, the parabolic reflector is the most expensive and heaviest part of the majority of antennas. Lens antennas, as a general rule, require substantial thickness and are even heavier and more expensive than the antennas utilizing parabolic reflectors.

In the foregoing types of antennas, each ray experiences precisely the same phase delay within the antenna. However, there is another type of antenna, the Fresnel zone antenna, in which the plane wave front is formed by rays of various phase delays. Antennas of the Fresnel zone type use plane reflective or transmissive surfaces, and in their simplest form, they utilize only those zones of a plane which intersect the spherical wave pattern for the purpose of effecting a contribution of energy having the desired uniform phase.

Stated somewhat differently, if a spherical wave is intercepted by a plane, the phase distribution on this plane forms a pattern of circular zones of constant phases. As the radius of these zones increases from zero, the phase also increases and repeats itself everytime shifts of multiples of $2\pi$ have been completed. It is these zones having the same phase that are called Fresnel zones. Having defined to some extent what constitutes Fresnel zones, it will be understood that a collimated beam of radiation can be generated by either of the following two techniques:

(1) Zoned Reflector: A plane sheet is reflective only along Fresnel zones, so that a strong diffraction beam will be reflected in a direction parallel to the axis of the zones.

(2) Zoned Transmitter: A plane sheet is transmissive only along Fresnel zones, so that a strong diffraction beam will be transmitted parallel to the axis of the zones. Owing to the optical similarity of the zoned transmitter with a refractive positive lens, such a device is referred to as a Fresnel zone lens.

Although a particular phase is generated only in zones of an infinitesimal width, field components of this phase are found in zones whose widths correspond to a phase range of $\pm \pi/2$. This means that the most efficient reflector or Fresnel lens reflects or transmits only one-half of the radiation available over the entire plane. This also means that one design can serve at the same time and with equal effectiveness as a reflector and as a lens.

In the case of a Fresnel zone plate, this plate consisting of alternating reflective and transmissive zones, it will be appreciated that it can be used either as a reflective or transmissive device. It will help in understanding the zone plate to visualize it as a circular diffraction grating. Hence, it can be seen that not only are the two collimated beams formed but there are also two spherical waves—a reflected one and a transmitted one—which emerge from the zone plate as a continuation of the incident wave pattern of the feed. Unfortunately, this means that not more than approximately 25 percent of the generated power can be expected in either the transmitted or reflected collimated beams. Another shortcoming of the zone plate is the inherent narrow bandwidth, since any change in the frequency would demand a change of the zone plate pattern. Consequently, while the basic zone plate antenna will provide the same resolution as a parabolic reflector antenna, the gain or efficiency is much lower and the bandwidth is seriously limited. The low efficiency and the change of the zone pattern with frequency have been great hindrances to the introduction of Fresnel zone plates in antenna designs.

Even though the low efficiency has been a great hindrance with respect to Fresnel zone plates, the low efficiency has been overcome to a high degree by a modified zone reflector antenna described by L. F. Van Buskirk and C. E. Hendrix, "Zone Plate as a Radio Frequency Focusing Element," IRE Trans. on Antennas and Propagation, volume AP-9, No. 3, May 1961, page 319, who use a continuous reflector at a quarter wavelength distance behind the zone plate. In this way, the transmitted power is reflected back through the transparent zones to join the initially reflected radiation, thereby producing a delay of a half cycle with a concomitant phase shift of $\pi$. Thus, the proper phase shift is achieved for all the radiation except for the variation between $-\pi/2$ and $+\pi/2$ within each zone. Not only does this eliminate the loss of the transmitted power, but it also effects the suppression of the spherical wave. The remaining variation of the phase within the zone causes a relatively higher side lobe pattern and, consequently, lower efficiency than that of a parabolic reflector. The phase shifting technique is akin to a reflector system, even though it does not offer a solution to the problem of the zone lens. No solution has been provided with respect to the problem of broadening the bandwidth, though. It should be pointed out that lens systems have essentially two advantages over reflector systems. First, the collimated beam does not interfere with the feed system. Therefore, transmitting and receiving equipment can be located next to the feed and the feed is accessible even during operation of the antenna. Second, warping of the lens plane has only a second order effect on the phase in the collimated beam. While in a reflective system, a displaced surface patch shortens or lengthens the propagation path by twice the amount of displacement, in a lens system the shortening of the propagation path on one side of the sheet is almost completely cancelled by the lengthening on the other side.

Accordingly, one object of the present invention is to provide a Fresnel zone lens antenna that will be highly efficient in its operation. In this regard, the invention has for an aim a method by which a relative phase shift of $\pi$ is achieved for the radiation going through adjacent zones of a zone lens. It is also within the purview of the invention to minimize the minor phase variations within the various zones.

Another object is to provide a feed which gives broadband characteristics to any zone plate antenna.

Still further, the invention has for an object the provision of an antenna of the foregoing character that will be inexpensive to manufacture, it being only necessary to utilize several sheets of plastic material on which certain printed patterns are placed.

Still further, the invention has for an object the provision of an antenna that can be collapsed and later unfurled when needed. This is a very desirable attribute with respect to conducting radio operations in conjunction with space programs. In this regard, an antenna of the envisaged type can be fabricated in such a way that it will have very little mass or weight.

These and other objects and advantages of my invention will more fully appear from the following description, made in connection with the accompanying drawings, wherein like reference characters refer to the same or similar parts throughout the several views and in which:

FIGURE 1 is a view illustrating the graphical derivation of the zone pattern involving the interception of a spherical wave by a plane;

FIGURE 2 is a rather diagrammatical view of a portion of a lens constructed in accordance with the teachings of the invention for the purpose of explaining the wave transmission through such a lens;

FIGURE 3 is a fragmentary detail taken in the direction of line 3—3 of FIGURE 2 for the purpose of showing the orientation of the grid lines applied to one plastic sheet;

FIGURE 4 is a view similar of FIGURE 3 but taken in the direction of line 4—4 of FIGURE 2 in order to show the grid orientation applied to a second sheet;

FIGURE 5 is a view also similar to FIGURE 3 but showing the grid orientation that is at 90 degrees with respect to that of FIGURE 3, this view being taken in the direction of line 5—5 of FIGURE 2;

FIGURE 6 is a schematic representation or symbol showing the direction of propagation through the lens of FIGURE 2;

FIGURE 7 is a symbol resembling that of FIGURE 6 but showing the direction of polarization;

FIGURE 14a is an equivalent circuit of the dipole set shown in FIGURE 11 but for the sake of completeness the dipole set of FIGURE 11 is repeated and is shown adjacent FIGURE 14a as FIGURE 14b;

FIGURE 15a is an equivalent circuit of a dipole configuration in which the phase shift is lagging and FIGURE 15b shows the coresponding dipole configuration;

FIGURE 16a shows another lagging equivalent circuit, FIGURE 16b illustrating the corresponding dipole configuration that produces such a circuitry and FIGURE 16c showing a still further arrangement in which an integration takes place within the dipole structure;

FIGURE 17a is an equivalent circuit showing a leading phase shift with FIGURE 17b depicting the dipole configuration that will produce such a phase shift;

FIGURE 18a illustrates still another equivalent circuit for producing a leading phase shift and FIGURE 18b illustrates the dipole configuration for obtaining same whereas FIGURE 18c shows a dipole configuration producing an integrated effect;

Figure 8:
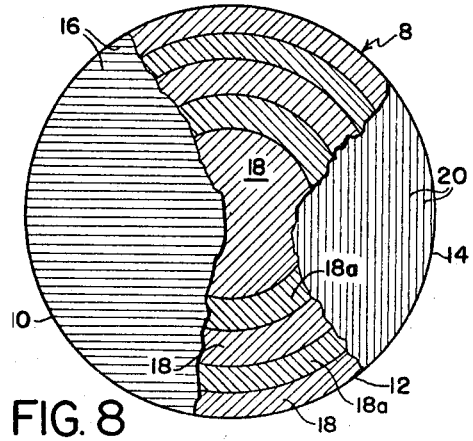
FIGURE 8 is a front elevational view of a zone lens having the polarization grids or gratings utilized in FIGURE 2, portions of two of the plastic sheets being removed in order to expose the grid arrangement that would otherwise be concealed from view.

FIGURE 1 has been presented for the purpose of depicting the geometry of the zone pattern and the manner in which such a pattern is derived. Accordingly, the feed has been labeled F and it will be assumed that the zone plate is aligned along the $y$ axis. The letter C is the closest point to the feed F and forms the center of the zone pattern. Since the phase intercepted by the plate lying in the $y$ direction is proportional to the slant distance $r$ to the feed F, the phase of an arbitrary point P on the zone plate can be easily derived as a function of $y$. First, one derives the trigonometrical relation $$r = x + e = \sqrt{x^2 + y^2} \quad (1)$$

Then the phase is defined as $$\phi_y = \phi_c + (2\pi e/\lambda) = \phi_c + (2\pi e f/c) \quad (2)$$

where $\phi_c$ is the phase at point C, $\lambda$ the wavelength, $f$ the radio frequency, and $c$ the velocity of light. If $e$, as defined in (1), is substituted for $e$ in (2) and the binomial term of the square root expressed as a series, one obtains $$\phi_y = (\pi f y^2/cx)(1 - (y^2/4x^2) + (y^4/8x^4) - \ldots)$$
$$= (\pi f y^2/cx)(1 - \epsilon) \quad (3)$$

From this monotonically with $y$ increasing phase pattern, only certain zones can be used to form the collimated beam. These are the zones in which the phase does not vary over more than $\pm \pi/2$ with respect to an arbitrary reference phase, whereby we disregard phase differences of integer multiples of $2\pi$. This results in a rejection of approximately 50 percent of the incident radiation.

From the foregoing analysis, it will be perceived that there is a circular portion of a wave front that is transverse to the line $x$ extending between the feed F and a zone plate disposed in the plane of the $y$ axis whose center is the intersection of the front with the direct ray, as this radius is such that the shortest path from the feed F through the periphery to the receiving point is ½ wave longer than the ray. A second zone, a third zone, a fourth zone, etc., are defined by successive increases of the path by half-wave increments. As the description progresses, it will be perceived that the present invention achieves relative phase shifts of $\pi$ in a zone lens. Quite briefly, this is accomplished by rotating the plane of polarization of a wave through 90 degrees as it passes through a transmissive system. Alternate rotation of the polarization in the in-phase and out-of-phase zones will result in phase alignment in all zones after transmission. In one embodiment, the polarization of a transmitted wave is rotated by 90 degrees without reflection by a set of three polarizing grids which are spaced a ¼ wavelength apart. The first grid, as will become manifest, is oriented in the direction of the polarization of the incident wave, the second grid is inclined at an angle of 45 degrees, while the third grid is oriented at an angle of 90 degrees. In a second embodiment, the above-mentioned first and third grids are utilized but instead of the intermediate grid, an array of crossed dipoles is utilized.

In order to understand and appreciate the benefits to be derived from a practicing of the invention, it will be helpful to refer to FIGURE 2 where a portion of a Fresnel zone lens 8 has been depicted rather diagrammatically. It will be seen from an inspection of this particular figure, though, that three sheets of plastic material labeled 10, 12 and 14 are spaced a ¼ wavelength apart. It is the first sheet 10 that has a grid or grating thereon composed of various horizontal parallel lines 16. The grid or grating 16 is oriented in the direction of the polarization of the incident wave. This orientation is shown in FIGURE 3 which is a fragmentary view taken in the direction of line 3—3 of FIGURE 2. Similarly, the sheet 12 has thereon a grid or grating composed of lines 18, as shown in FIGURE 4, arranged at an angle of 45 degrees with respect to the lines 16. Still further, the sheet 14 has a grid or grating consisting of lines 20, as can be seen from FIGURE 5, these lines being oriented at an angle of 90 degrees with respect to the lines 16 and are, of course, oriented at an angle of 45 degrees with respect to the lines 18.

The transmissive and reflective action that occurs as electromagnetic energy passes through the lens 8 of FIGURE 2 is not readily understandable from the mere presentation of the grid arrangements that have been alluded to. Because of this, the symbol shown in FIGURE 6 has been employed, the symbol itself merely involving a circle 22 but having disposed therein an arrow 24 which signifies the direction of propagation through the lens of FIGURE 2. Still further, what is depicted in FIGURE 7 is intended to illustrate the direction of polarization. In this regard, the circle 22 has an arrow 26 which is exterior of the circle. Consequently, when both of the arrows 24, 26 are considered, the reader will be apprised of the direction of propagation as well as the direction of polarization. As will become evident, the various circles 22 used in FIGURE 2 are such as to indicate the amplitude of the energy at a given point. Accordingly, attention is called to the use of an amplitude factor $k=1/\sqrt{2}$. Still further, in an effort to make the comprehension of what takes place in conjunction with FIGURE 2 as readily understandable as possible, certain vertical and horizontal lines have been lightly superimposed upon this figure. The vertical spaces, which have been labeled 1, 2, 3, 4, 5a, 5b and 6 and which are defined by the light horizontal lines, indicate the various steps that take place, and the spacing of the light vertical lines is such that the distance between any two vertical lines measured in a horizontal direction is a ¼ wavelength.

Referring specifically now to the action occurring when a wave is transmitted through the portion of the lens 8 shown in FIGURE 2, the first step illustrates the wave front before entering the first grid 16. It will be assumed that the wave energy is polarized in a vertical direction and, therefore, the grid 16 is oriented for full transmission of this wave. Step two which is pictorially represented in the space defined immediately below the first or uppermost symbol 22, the second symbol 22 residing between the plastic sheets 10 and 12, shows the unchanged wave between the grids 16 and 18. As the vertically polarized wave strikes the grid 18, it is split into two components of equal magnitude, as shown by the factor $k$, but involving orthogonal polarization. This is in the third space down and it will be seen that two circles 22 have been presented, each containing the letter $k$.

Tracing the action still further, the component which is oriented in a direction perpendicular to the grid 18, this being denoted by the arrow 26 in the circle 22 toward the right, will propagate into the space between the grids 18 and 20 while the other component is reflected into the space between the grids 16 and 18. Step three, therefore, involves a phase reversal as can be discerned by comparing the arrows 26 associated with this particular step with the arrow 26 for step two. Although step four is admittedly more complex, it can now be understood that a further split of the transmitted and reflected component waves takes place so that four wave components of equal magnitude result, these being graphically represented in the space bearing the numeral 4 at the left.

After this split has taken place, there are two components that now propagate into free space, one being reflected and one being transmitted; the reflected one is, of course, the one appearing to the left in the space labeled 4 and the one being transmitted being to the right in this space. On the other hand, the two components that are still trapped between the sheets 1 and 3 propagate toward the center grid 18 where they are split into four components as shown in the space labeled 5a and which are combined into two wave components as shown in 5b. These latter two components propagate toward the outer grids 16 and 20 and it happens that they are polarized in the proper way for continuing into the free space without interference.

Consequently, in step six, there are two reflected components and two transmitted components. Fortunately, the phasing of the reflected components result in a cancellation thereof due to destructive interference, whereas the transmitted components add up due to constructive interference. Thus, the polarizing lens portion depicted in FIGURE 2 and which has just been described rather generally is fully transmissive inasmuch as no energy is actually reflected to the left which is in the direction of the source or feed. In other words, using FIGURE 1 as an aid, the feed F would be propagating energy in the direction of the lens 8 composed of the sheets 10, 12 and 14 with the grids 16, 18 and 20 thereon when the lens 8 is placed in the plane indicated by the y axis of FIGURE 1.

Having presented the foregoing information, the construction of the complete zone lens 8 pictured in FIGURE 8 will be better understood. Actually, the lens portion of FIGURE 2 deals with what happens with respect to but one annular ring or zone of a number of such rings or zones for effecting the alternate rotation of the polarization. It will be recalled that so-called in-phase and out-of-phase zones result and it is an aim of the invention to provide a phase reversal such that a lens constructed in accordance with the present invention will be fully transmissive. It will be recognized that FIGURE 8 shows the complete plastic sheets 10, 12 and 14 on a much smaller scale than the sheet fragments of FIGURE 2, a portion of the sheet 10 being broken away in order to reveal the grid arrangement on the sheet 12 and a portion of the sheet 12 having been broken away in order to show the grid arrangement on the sheet 14. It can be discerned from FIGURE 8 that the grid on the sheet 12 is composed of zones having lines 18 inclined at 45 degrees in one direction with respect to the orientation of lines 16 on the sheet 10 and that alternate zones have lines 18a arranged at 45 degrees in an opposite direction with respect to the lines 16 on the sheet 10. In describing FIGURE 2, it may be assumed that we dealt with only the lines 18, which form but one annular zone, but it should be appreciated that where there is a need for phase reversal, the reversal is achieved with the lines 18a and is realized at the proper location.

It will be recognized that the polarization lens 8 shown in FIGURE 8 is a frequency sensitive device because ½ of the energy is delayed ½ wavelength with respect to the initial wave. However, for most radar communication and astronomical applications, the device can be considered broadband.

Figure 9:
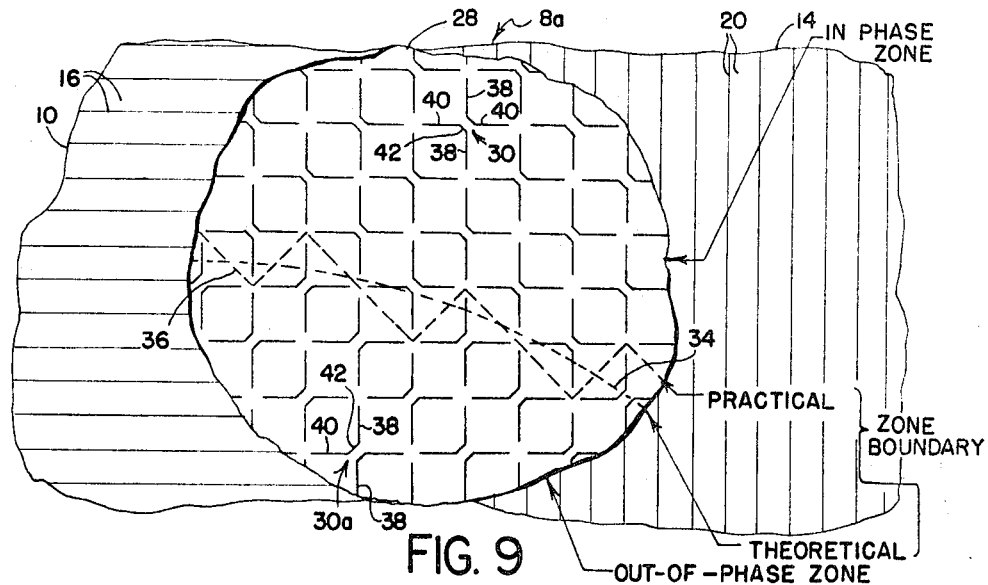
FIGURE 9 is a view corresponding generally to FIGURE 8 but employing an intermediate zone sheet having a dipole array thereon rather than a grid arrangement.

A modification of the lens 8 shown in FIGURE 8 is pictured in FIGURE 9. The lens 8a of FIGURE 9 offers a higher efficiency by minimizing the minor phase variations within the various zones. To accomplish this, the lens of FIGURE 9 utilizes the same sheets 10 and 14 with their grids 16 and 20 but employs an entirely different center sheet 28. Instead of the slanting stripes or lines 18, 18a utilized in the embodiment of FIGURE 8, the present embodiment employs an array of crossed dipoles that are printed on this sheet 28. The dipoles have been designated by the reference numerals 30, 30a. The dipoles 30 are located in what has hereinbefore been termed the in-phase zone and the dipoles 30a are located in what amounts to the out-of-phase zones. A portion of each of these zones is shown in FIGURE 9. Theoretically, the zones having the dipoles 30, 30a therein can be said to be divided by a curved line 34. As a practical matter, though, the dividing line is not a smooth one but is of a zig-zag nature as denoted by the line 36.

Figure 11:
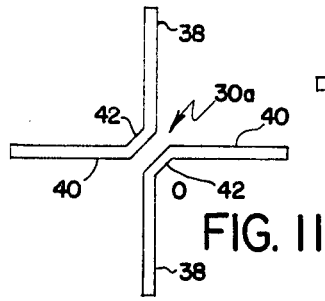
FIGURE 11 illustrates on a larger scale one of the crossed dipole sets or configurations shown in FIGURE 9.

One set of crossed dipoles 30a is shown on a larger scale in FIGURE 11. It will be observed from this particular figure that one dipole of a set is composed of vertically oriented conductors 38 and the other dipole of horizontally oriented conductors 40, these conductors being connected by what are best referred to as very short transmission lines 42. Hence, the conductors 38, which are vertically oriented, function as a receiving antenna and the conductors 40 as a transmitting antenna. Stated somewhat differently, the energy that is received by one dipole 38, 38 is transmitted by the other dipole 40, 40 at an orthogonal polarization. Hereby, the outer polarization grids 16 and 20 are very essential for perfect match of the dipole arrays to the free space. To achieve phase reversal, which will be dealt with with greater particularity hereinafter, between alternate zones, the dipole sets 30 in the in-phase zones are connected in such a way that the current flows at a given instance in a clockwise direction, while in the out-of-phase zones of the dipole sets 30a, the connections are such that the current follows a counterclockwise direction during the same instant. Close inspection of FIGURE 9 will reveal that the short transmission lines 42 below the line 36 are inclined in one direction, whereas the transmission lines 42 above this line are oriented at a reverse inclination, the dipole sets having been distinguished from each other by the suffix a with respect to the out-of-phase zone dipoles as should now be readily apparent.

Figure 10:
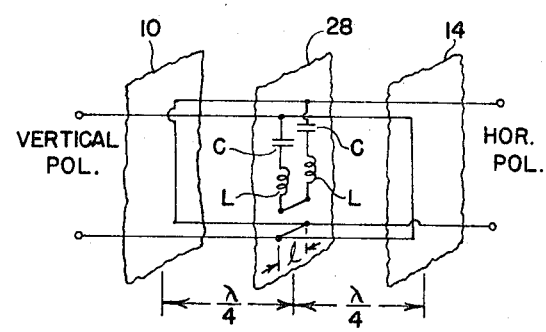
FIGURE 10 is a schematic diagram illustrating the equivalent network of a dipole coupling.

It is recognized that dipole arrays have found wide use as either transmitting or receiving antennas. Such use is employed in the present embodiment. However, by proper spacing, very good match to the load can be achieved about the resonance frequency of a particular dipole. The equivalent network of a crossed dipole pair is shown in FIGURE 10. Since at resonance the series connection C–L–L–C forms a short circuit, the energy is retransmitted in this situation without phase shift. FIGURE 10, quite obviously, is only intended to be a very diagrammatic representation of the circuit and it will be perceived that the sheets 10, 14 and 28 have been positioned relative to each other for the purpose of illustrating with greater clarity the equivalent circuit. The grid lines on the sheets 10 and 14 have been omitted in order to simplify this particular view as much as possible.

Figure 12:
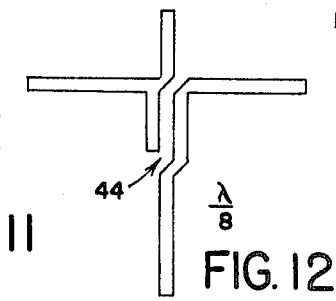
FIGURE 12 is a view resembling FIGURE 11 but showing a set of dipoles having a delay line incorporated therein, the configuration giving a delay of ⅛ wavelength.
Figure 13:
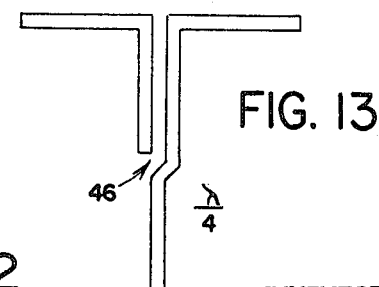
FIGURE 13 is a dipole set involving a delay line which produces a delay of a ¼ wavelength.

With continued reference to FIGURE 10 for the moment, it will be appreciated that if the two dipoles are connected over a line of appreciable length 1, a delay or phase lag can be imparted to the transmitted wave. While FIGURE 11 shows a zero or no phase shift, attention is now directed to FIGURES 12 and 13 in which the dipole sets 44 and 46 provide phase shifts of ⅛ wavelength and ¼ wavelength, respectively. Although the configurations shown in FIGURES 12 and 13 are quite simple and which can be easily printed on the plastic sheet 28, nonetheless these configurations are somewhat limited with respect to longer delays because they become impractical and negative delays or phase advancements cannot be realized. However, the delay line can be replaced by a lumped equivalent circuit of L and C components. By interchanging the L's and C's, phase reversal can be achieved. Consequently, where either negative delay or phase advancement is desired, the configurations 44 and 46 of FIGURES 12 and 13 cannot be used. However, lumped circuits can be designed for phase advancement by exchanging capacitors and inductors as above noted in the equivalent circuit of the transmission line. Several examples of lagging and leading phase shifters with separate components or components integrated with the dipole components are shown in figures now to be briefly alluded to. In this regard, lagging phase shifters are shown in FIGURES 14b, 16b, and 16c. It is not felt necessary to describe the dipole sets 48, 50 and 52 in any detail, especially inasmuch as the equivalent circuits for these dipoles are shown to the left thereof in the form of FIGURES 15a and 16a, the reference numeral 48a being for the dipole 48 and the reference numeral 50a for the dipole 50; the integration feature of the dipole 52 is shown by the brackets associated with the inductances of the circuit 50a. It might be mentioned in passing with respect to the dipole set 52 of FIGURE 16c that the integration feature is derived by the tapered conductors that can be readily observed, the increased inductance coming from the narrowest segments thereof where the current is strongest and the magnetic field lines are the shortest.

As for FIGURES 17b, 18b and 18c, these dipole configurations, which are designated by the reference numerals 54, 56 and 58, produce a leading phase shift. As with the dipole sets 48, 50 and 52, the equivalent circuits are shown to the left in FIGURES 17a and 18a, the reference numeral 54a identifying the circuit for the dipole 54 and the reference numeral 56a being indicative of the circuit for the dipole 56 with the integration feature represented by the brackets as was done in FIGURE 16a. For the sake of completeness, the dipole 30a has been shown in FIGURE 14b and the equivalent circuit for this dipole is shown just to the left in FIGURE 14a, being identified by the reference numeral 30b.

Up to this point, nothing has been said with reference to the particular feed that can be utilized when practicing the invention. A feed which has a phase center of the radiation which changes with frequency in the required manner can be realized with a specially designed end-fire array. The essential elements of such an array are a feeding transmission line and various radiating devices coupled to this line. A transmission line 61 has been depicted in FIGURE 19 and a feed has been connected thereto which has been generally indicated by the reference numeral 62. The feed 62 includes a plurality of dipoles 62a–62g which are tapered according to the required dispersion of the foci and provides a solution to the feed problem. Assuming that the entire spectrum of frequencies is fed to the radiating device 62 from the left end thereof in FIGURE 19 to the lens 8, the higher frequencies will be radiated first while the lower frequencies travel farther down the array of dipoles before they are radiated out. This action can be achieved by resonance coupling to the various radiating devices which are in the form of the tapered dipoles 62a–62g. It will be appreciated that the dipoles can have their length and width selected so that they radiate only a narrow band of the spectrum. The point to be borne in mind is that the various dipoles 62a–62g collectively produce the overall radiation. The longitudinal spread of the various dipoles determines the illuminating beamwidth of the feed which should be matched to the aperture of the zone lens 8.

Figure 19:
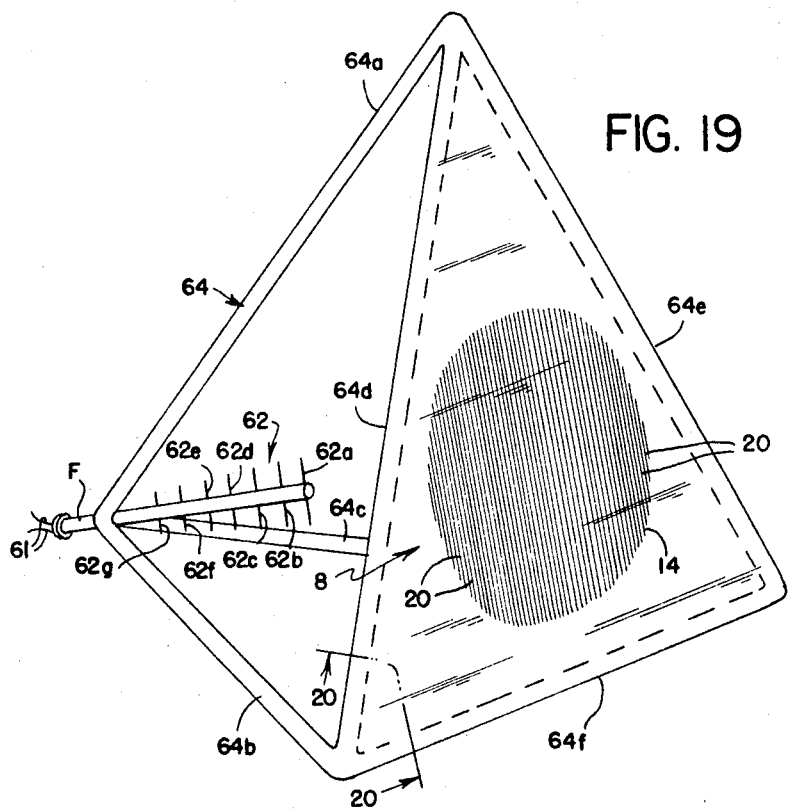
FIGURE 19 is a perspective view of an unfurlable Fresnel lens antenna constructed in accordance with the teachings of the present invention.

One of the advantages flowing from the use of a zone plate or lens 8 is that it consists of plane sheets, the plastic sheets 10, 12 and 14 having already been described. Therefore, it is practical to use extremely thin plastic films for the sheets 10, 12 and 14 (and also the sheet 28). In other words, the thickness of the sheets is not important inasmuch as the films or sheets (as the case may be) can be appropriately supported adjacent their edges so as to maintain a substantially planar relationship with each other. In FIGURE 19, it can be assumed that the sheets 10a, 12a and 14a are actually very thin triangularly shaped films and that the grids 16 and 20 are deposited on the sheets 10a and 14a in the form of a very thin metallic coating. By the same token, the grid lines 18, 18a can be so applied to tse sheet 12a (or the dipoles 30, 30a on a sheet or film corresponding to the sheet 28). Various known techniques of metallizing may be employed. Still further, it is possible to start with uniformly metallized sheets or films and remove the metal coating in the areas that are to be devoid of metal by chemical etching in order to form the desired grid pattern. A still further possibility is to form the polarizing sheets 10, 12, 14 with cloth in which some of the threads of the warp are formed by very fine wires. Sheets so constructed are naturally quite light and flexible so that they can easily be furled up for transporation and protection. Of course, the thin films mentioned above are likewise susceptible to being folded or furled.

Figure 20:
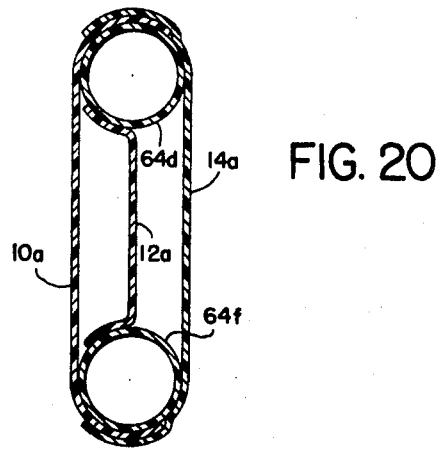
FIGURE 20 is an enlarged sectional view taken in the direction of line 20—20 of FIGURE 19.

Having mentioned the furling capability, the invention will certainly find utility where compact storage is initially intended prior to actual use of the lens. Such situations occur quite frequently when conducting various space operations. Accordingly, the invention has for an aim the provision of a tetrahedral framework 64 composed of inflatable tubes 64a–64e, all as is clearly pictured in FIGURE 19. In this situation, the lens 8 is stretched between the tubes or legs 64d, 64e and 64f, a sectional view of the legs 64d and 64f appearing in FIGURE 20 which is a view taken in the direction of lines 20—20 of FIGURE 19. Various means can be used for anchoring the edges of the sheets 10a, 12a, 14a. For instance, a suitable adhesive can be utilized for securing the edges to the mentioned legs. It will be appreciated, though, that the tetrahedral framework 64 allows the lens 8 to be precisely positioned with respect to the feed 62, which is located at the apex remote from the triangle composed of the tubular legs 64d, 64e and 64f to which the lens 8 is attached. While the framework 64 can be made of various plastic material capable of being formed into the pressure erectable tubular legs, it is suggested that the material be of a Mylar-aluminum laminate which assures strength and rigidity, so that the pressurizing gas can be subsequently released without actually causing the framework 64 to collapse or to distort.

From what has been said above, it will be recognized that the entire Fresnel zone lens 8 (or the lens 8a when it is used) and the framework 64 can be collapsed into a very compact condition about the feed 62, and that the unfurling can be accomplished when needed, such as after a launching operation has been consummated and the space vehicle is moving in a desired orbit. Obviously, a lens construction of the described type will have many, many uses or applications.

It will, of course, be understood that various changes may be made in the form, details, arrangements and proportions of the parts without departing from the scope of my invention as set forth in the appended claims.

What is claimed:
1. A Fresnel zone lens antenna comprising:
first polarizing means residing in a first plane;
second polarizing means residing in a second plane parallel to said first plane and spaced a predetermined distance therefrom, the plane of polarization of said second polarizing means being oriented at an angle of 90 degrees relative to that of said first means;
said first and second polarizing means include polarizing grids oriented at an angle of 90 degrees with respect to each other;
third means residing in a third parallel plane between said first and second planes for rotating the polarization plane of an incident wave through 90 degrees as the wave energy passes from said first polarizing means to said second polarizing means, said third means including a polarizing grid oriented at an angle of 45 degrees with respect to the grid of said first means and at an angle of 45 degrees with respect to the grid of said second means;
said third means further including zones of alternate rotation of polarization composed of said polarizing grids, the grids in one zone being inclined at an angle of 45 degrees in one direction and the grids in the next adjacent zone being inclined at an angle of 45 degrees in the opposite direction.
2. An antenna for transmitting an incident wave, comprising
first polarizing means residing in a first plane;
second polarizing means residing in a second plane parallel to said first plane and spaced a predetermined distance therefrom, the plane of polarization of said second polarizing means being oriented at an angle of 90 degrees relative to that of said first means;
said first and second polarizing means including polarizing grids oriented at an angle of 90 degrees with respect to each other; and
third means residing in a third parallel plane between said first and second planes for rotating the polarization plane of the incident wave through 90 degrees as the wave passes from said first polarizing means to said second polarizing means, said third means including an array of crossed dipoles, each of said crossed dipoles including a first pair of spaced first conductors oriented in a first direction for receiving the incident wave transmitted through said first polarizing means, a second pair of spaced second conductors oriented at an angle of 90 degrees with respect to said first pair for transmitting said wave with the plane of polarization thereof rotated through 90 degrees, and a transmission line connecting each of said first conductors to one of said second conductors.
3. A Fresnel zone lens antenna according to claim 2, in which:
the crossed dipoles in said array are arranged in Fresnel zones, the first and second conductors in a given zone being connected by said transmission lines for rotating the plane of polarization of said wave 90 degrees in a first direction and the first and second conductors in a zone next adjacent to the given zone being connected by said transmission lines for rotating the plane of polarization of said wave 90 degrees in a second direction opposite to said first direction.
4. An antenna in accordance with claim 3 in which:
those dipoles in one zone nearer the next adjacent zone are constructed with phase shifting characteristics.
5. An antenna according to claim 4, in which:
said transmission lines of said crossed dipoles constructed with phase shifting characteristics include sections extending parallel to each other between and beyond the respective first and second conductors to which the transmission lines are connected for producing a lagging phase shift in said wave.
6. An antenna according to claim 4, in which:
said transmission lines of said crossed dipoles constructed with phase shifting characteristics include first sections extending parallel to each other and at least one of said transmission lines includes a second section in series with the first section and having an arcuate configuration for producing a leading phase shift in said wave.
7. A Fresnel zone lens antenna comprising:
a tetrahedral tubular frame;
radiator feed means disposed at one apex of said frame;
three substantially parallel sheets of plastic material extending across the triangular opening opposite said radiator means;
respective polarizing grid means on each of the outer sheets;
the grid means on the sheet nearer said radiator means being oriented in the direction of the polarization of the incident wave from said radiator means and the grid means on the sheet farther from said radiator means being oriented at an angle of 90 degrees relative to said first grid means, and
additional polarizing means on the intermediate sheet for rotating the polarization plane of the incident wave energy passing through said nearer sheet through an angle of 90 degrees,
whereby wave energy originating at said radiator means is propagated into space from said farther sheet in the form of a collimated beam.
8. An antenna in accordance with claim 7 in which:
said tubular frame is of inflatable plastic material.

9. An antenna in accordance with claim 7 in which: said additional polarizing means includes a plurality of annular zones with each zone having a grid oriented at an angle of 45 degrees with respect to the respective grid means on said outer sheets and at an angle of 90 degrees with respect to the next adjacent zone.

10. An antenna in accordance with claim 7 in which: said additional polarizing means includes a plurality of annular zones with each zone having a plurality of crossed dipoles and connected for instantaneous current flow in an opposite direction from those dipoles in the next adjacent zone.

11. An antenna in accordance with claim 10 in which: a phase shift characteristic is incorporated into those dipoles in one zone that are in a proximal relationship with the next adjacent zone.

12. An antenna for transmitting an incident wave having a given polarization, comprising:
   first polarizing means residing in a first plane for transmitting said wave;
   second polarizing means residing in a second plane parallel to said first plane and spaced a predetermined distance therefrom, the plane of polarization of said second means being oriented at an angle of 90 degrees relative to that of said first means;
   third means residing in a third parallel plane between said first and second planes for rotating the polarization plane of the incident wave through 90 degrees as the wave energy passes from said first polarizing means to said second polarizing means, and
   feed means disposed in a spaced relationship with said first, second and third means for directing said wave at said first polarizing means, said feed means including an array of tapered dipoles oriented with respect to said first polarizing means so that the higher frequencies of said wave will be radiated toward said first polarizing means first while the lower frequencies of said wave will travel farther down said array before radiation thereof toward said first polarization means.

13. A Fresnel zone lens antenna for transmitting a wave, comprising:
   first polarizing means residing in a first plane;
   second polarizing means residing in a second plane parallel to said first plane and spaced a predetermined distance therefrom, the plane of polarization of said second means being oriented at an angle of 90 degrees relative to that of said first means;
   third means residing in a third parallel plane between said first and second planes for rotating the polarization plane of an incident wave through 90 degrees as the wave passes from said first polarizing means to said second polarizing means;
   a tetrahedral framework:
   said first, second and third polarizing means overlying one triangular side of said framework; and
   feed means disposed at the apex of said framework opposite to said one triangular side and including an array of tapered dipoles oriented so that the higher frequencies of said wave will be radiated toward said first, second and third means first while the lower frequencies of said wave will travel farther down said array before they are radiated toward said first, second and third means.

References Cited by the Examiner
UNITED STATES PATENTS

| | | | |
|---|---|---|---|
| 1,988,434 | 1/1935 | Bohm et al. | 343—811 |
| 2,341,558 | 2/1944 | Kandoian | 343—813 |
| 2,554,936 | 5/1951 | Burtner | 343—756 |
| 3,148,370 | 9/1964 | Bowman | 343—753 |
| 3,189,907 | 6/1965 | Buskirk | 343—753 |

HERMAN KARL SAALBACH, *Primary Examiner.*

M. NUSSBAUM, *Assistant Examiner.*